Sept. 28, 1965   J. J. COURTIN   3,209,206
OVERTEMPERATURE PROTECTED APPARATUS
Filed Feb. 9, 1962
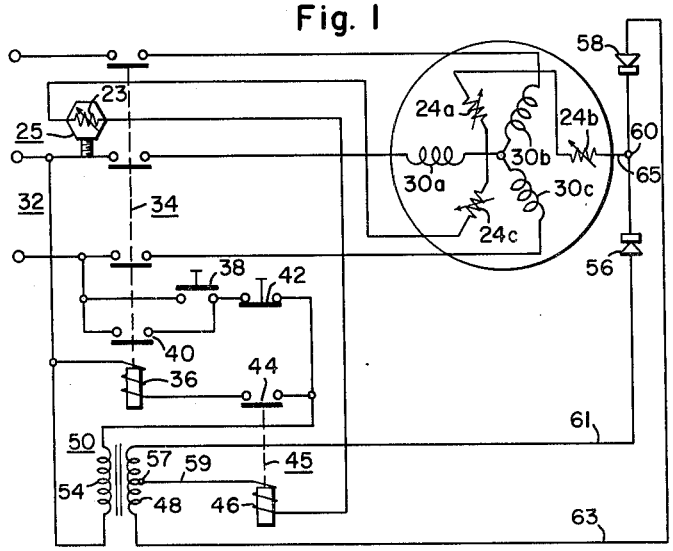
INVENTOR
John J. Courtin
BY E. H. Liss
ATTORNEY United States Patent Office 3,209,206
Patented Sept. 28, 1965

3,209,206
OVERTEMPERATURE PROTECTED APPARATUS
John J. Courtin, Buffalo, N.Y., assignor to Westinghouse Electric Corporation, East Pittsburgh, Pa., a corporation of Pennsylvania
Filed Feb. 9, 1962, Ser. No. 172,311
3 Claims. (Cl. 317—41)

The present invention relates to overtemperature protected apparatus, and more particularly, to an overtemperature protective system for detecting overloads in branch circuit conductors of inherently protected electrical apparatus.

Dynamoelectric machines and other electrical apparatus have usually been protected against overheating by means of thermal overload relays having a thermally responsive element, usually a bi-metallic element heated either directly by the current of the protected apparatus, or by a heater carrying the current, so that the relay responds solely to the current. Relays of this type do not give entirely satisfactory or adequate protection, however, since the relay responds only to the current and the thermal characteristics of the relay do not, and obviously cannot, match those of the protected apparatus, so that the thermal response differs from that of the motor. Thus, the relay is affected differently from the machine by changes in the ambient temperature, and the response of the relay may also be affected by heat from other adjacent devices, or by air currents and similar conditions which do not affect the machine.

An overtemperature protective system which provides inherent protection against overtemperature is illustrated and described fully in application, Serial No. 742,667 by D. J. MacGregor, filed June 17, 1958, now Patent No. 3,036,242, issued May 22, 1962, and assigned to the assignee of the present invention. With the protective system described in the above-mentioned application, protection is responsive to winding temperature alone and not time or current. Since the usual thermal overload relays are designed for inverse time action with respect to current, their operation is independent of winding temperature, which may be either cold or overheated. The sensing element in the inherent protective system may be a positive temperature coefficient thermistor. These thermistors are about the size of an aspirin tablet, and after encapsulation to provide insulation, are embedded in the motor winding. One of the outstanding characteristics of these thermistors is that in some predesigned narrow temperature range, the thermistor resistance sharply increases to approximately 20 times or more its cold resistance value. This change in resistance is utilized in the control circuitry to provide a corresponding increase in voltage sufficient to actuate a relay which, in turn, opens the line starter holding circuit. Because of the small size of the thermistor, which allows it to become a very small part of the surrounding system of the motor winding, it can follow the winding temperature very closely and provide an exceptionally high quality of temperature protection to the windings to which it is attached.

A wider usage of the above-described system could be realized were it not for a possible concern as to the adequate protection of the motor branch circuit cables and the contactor itself when selected and applied in accordance with established codes and practices. When thermal overloads based on current values are omitted, the concern is that inherent protected electrical apparatus could in certain specific applications permit currents which in some cases might be large enough to overheat the motor branch circuit conductors or the control apparatus. An example of such an application may be in a refrigerator motor where an atmosphere of refrigerant passes through the motor thereby keeping the motor windings cool, but permitting large enough currents to flow to overheat the branch circuit conductors. It is also possible in some applications to permit greater overload in the protected apparatus without causing the line to open if some means could be provided to protect against damage of the branch circuit conductors or the contactors.

The principal object of the present invention is to provide branch circuit cable protection for inherent overtemperature protected apparatus.

Another object of the present invention is to provide simple and economical branch circuit conductor protection which also protects against overheating of contactors in inherent overtemperature protected apparatus.

A further object of the present invention is to provide simple and economic overtemperature protection for line cables and contactors associated with inherently overtemperature protected apparatus by utilization of a single thermistor in addition to the sensing element for the protected apparatus.

Other objects and advantages of the invention will be apparent from the following detailed description, taken in conjunction with the accompanying drawings, in which:

FIGURE 1 is a circuit diagram of an inherently overtemperature protected apparatus embodied in the present invention;

FIG. 2 is a curve showing a resistivity characteristic of an example of a positive temperature coefficient thermistor which may be employed in the present invention;

FIG. 3 is a side elevational view of the stationary contact of the contactor employed in this invention;

FIG. 4 is a side elevational view partly in section showing the thermistor assembly of this invention; and, FIG. 5 is a top elevational view of the thermistor assembly shown in FIG. 4.

Briefly, the present invention is an improvement over the overtemperature protective system described in the above-mentioned MacGregor application, Serial No. 742,667, wherein an additional positive temperature coefficient thermistor may be connected in series with the thermistors employed to sense temperature in the windings of the protected apparatus. This thermistor may be located at the junction of the cable and the cable clamp. The thermistor may be embedded in a metal threaded housing which can be used in place of the clamping set screw which actuates the cable clamps. Thus, the thermistor is located at the junction of the cable and the contactor cable clamp thereby being in a position to sense overheating in either the cable, the contactor or both.

Although this invention, by way of example, is illustrated as being utilized with a stator winding of a dynamoelectric machine, it will be understood that this protective circuit may have other and different uses as for example in a transformer or other electrical apparatus which is subject to overheating and which includes branch cable conductors. Although a specific form of contactor is shown and described for the purpose of illustration, it will be understood that this invention may be employed with other and different contactors. It should also be understood that although, by way of example, a specific type of set screw for a cable connector is described, other and different types of connectors may be employed; likewise other and different types of temperature sensing resistance elements can be utilized. The curve shown in FIG. 2 illustrates the characteristics of a positive temperature coefficient thermistor which is suitable for use in this invention. This is an example of one temperature range for which the thermistor may be designed, but it will be understood that this is exemplary only and that thermistors can be made having characteristics which result in switching at other seelcted temperatures. Negative temperature coefficient thermistors may be employed, if desired.

FIG. 1 shows the manner in which one embodiment of the protective device is electrically connected for use in the stator winding of a three-phase induction motor. The apparatus temperature sensing unit 24 comprises three individual resistance elements or thermistors 24a, 24b and 24c connected in series. Each of the temperature sensing resistance elements or thermistors is embedded in a winding of the motor as indicated in FIG. 1. This embodiment shows a three-phase motor having phase windings 30a, 30b and 30c, connected to a three-phase line 32 by means of a contactor 34 of any suitable type. A three pole contactor 34 is energized by coil 36 which coil is connected across one phase of the line 32 through a start push button 38 and a stop push button 42. A sealing contact 40 actuated by the coil 36 is connected across the contact of start push button 38. Protective relay 45 has normally opened contacts 44 connected in series with the coil 36. Contacts 44 of protective relay 45 are actuated to closed position by energization of coil 46. The protective system includes transformer 50 having a primary winding 54 and a secondary winding 48. The primary winding 54 is connected in parallel with coil 36 and relay contacts 44 and in series with the start push button 38 so as to be energized or switched on when the start contacts are closed. The protective circuit so far described is identical with the protective circuit shown and described in application, Serial No. 742,667 hereinabove referred to.

In the present invention, an additional thermistor 23 is connected in series with the thermistors 24, the latter being embedded in the motor. A thermistor assembly 25 includes the thermistor 23 and a small metal housing 27 having a threshold stud 29 projecting therefrom. The thermistor 23 is embedded in an insulating compound 31 contained in the small metal housing 27. The housing 27 has projecting therefrom at its end remote from the threaded end leads 35 secured to the thermistor. The leads 35 include connecting members 37 at the end remote from the thermistor. The housing 27 and the stud 29 may be of good heat conducting material such as copper or brass. The portion of the husing which contains the thermistor may be enlarged and of hexagonal shape so as to permit application of a wrench or other tightening device. It may be of any other shape or form which is adaptable as an actuating member for a cable clamp and which can receive a tool for proper assembly purposes.

The insulating compound 31 in the metal housing 27 of the cable thermistor assembly 25 should be of good heat conductive material such as lead or aluminum filled resin.

The secondary 48 of transformer 50 is center tapped as at 57 by center tap lead 59. Coil 46 is connected at one side to center tap 57 by lead 59. At its other side it is connected to one side of the sensing circuit comprising sensing elements 23 and 24 in series by conductor 59A. To each side of the transformer secondary 48 is connected one of the like terminals of rectifiers 56 and 58 through leads 61 and 63, respectively. Rectifiers 56 and 58 are connected at their other like terminals to a common point 60. The lead 65 connects point 60 with the other side of the sensing circuit comprising sensing elements 23, 24A, 24B and 24C.

When the start button 38 is depressed, current flows through the start button contact, the stop button contacts and transformer primary 54. Since contacts 44 are open, current will not immediately flow through coil 36. However, upon energization of transformer 50, contacts 44 are closed thereby completing the circuit through coil 36 and thereby energizing the motor simultaneously with the energization of the protective circuit. When the temperature of the motor is low, the resistance of the sensing unit 24 is also low and relay 45 is energized closing contacts 34. This allows normal operation of the conventional motor starting apparatus. When the temperature of any of the thermistors 24 or the temperature of thermistor 23 rises above a predetermined safe value, the resistance of the series connected sensing circuit increases sharply, deenergizing relay 45 and opening contact 44, thereby deenergizing coil 36 and disconnecting the motor from the line 32.

In the embodiment herein illustrated, after the motor has been disconnected from the line because of overtemperature either in the line cable or the windings, the thermistors 24 and the thermistor 23 must cool to a temperature below the preselected temperature level before it is possible to reclose relay contacts 44 by energizing coil 46 through start button 38. This additional protection against restarting until a return to a safe operating temperature is accomplished by employing a relay 45 which has a pick up current somewhat higher than the drop out current.

The stationary contacts of a typical 3 pole contactor 34 employed in a motor control circuit are illustrated in FIG. 3. Complete contactors of this type including the movable contact are shown and fully described in Patent No. 2,550,110 by D. Ellis, issued April 24, 1951, and the patent to R. T. Basnett No. 2,626,331 issued January 20, 1953. The location and operation of the thermistor assembly 25 can best be seen in FIG. 3 where cable conductor 32 is secured to a set of stationary contacts 41 at terminal 43. A cable clamp 45 is actuated to secure the cable 32 to the terminal 43 by action of the threaded portion 29 of the thermistor assembly 25. The stationary portion of the contactor 34 includes a pair of contacts 41, 41a for each phase which are secured to a molded base. The upper contact 41 as seen in the drawing is connected with terminal 43 and lower contact 41a as seen in the drawing is connected with a lower terminal 47. The movable contacts, not shown, include a movable contact arm which carries a contact bridge and has two contacts which are engageable with and bridged to the stationary contacts 41 and 41a. The thermistor assembly 25 is located in good heat transfer relation with both the stationary portion of the contactor 34 and the cable conductor 32. Therefore, overheating in either the contactor or the cable will cause a sharp change in resistance of thermistor 23 which is embedded in the thermistor assembly 25 which assembly is effectively a set screw. Thus, overheating and a consequent change in resistance of thermistor 23 will serve to deenergize coil 46 of the protective circuit thereby deenergizing the main contactor coil 36, thus opening the main contactor 34 to disconnect the apparatus from the line in the same manner as the affect of overheating of any of the thermistors in the thermistor assembly 24.

The particular resistance elements or thermistors shown have a positive temperature coefficient of resistance and operate in a temperature range which is most suitable to protect the motor. The switching temperature of thermistor 23 may be different from the switching temperature of thermistors 24a, 24b and 24c. An example of a suitable resistance material is described in Patent No. 2,981,699 issued April 25, 1961, to Y. Ichikawa and assigned to the Westinghouse Electric Corporation. It can be seen from FIG. 2 that for a range of temperature below a predetermined value, which would be the normal operating temperature of the device to be protected, the resistance is substantially constant. At a given temperature, the curve rises sharply indicating the extremely rapid rise in resistance with rising temperature. Thus, the curve shows that the temperature sensitive resistors or thermistors have a relatively low temperature coefficient of resistance at normal temperature compared with a much higher temperature coefficient resistor at elevated temperature above a predetermined value. The value shown on the curve in FIG. 2 is for the purpose of illustration. It will be understood that the temperature at which the resistance begins to rise rapidly can be preselected by selecting the desired composition of the material. It will, of course, be understood that for some applications where all of the advantages hereof are not required, negative temperature coefficient resistance elements may be used, provided of course, that certain changes are made in the remainder of the circuit to accommodate them.

It should now be apparent that line cable or branch circuit cable conductor overtemperature protection is provided by relatively simple and economical apparatus which is applicable in its broader aspects to any type of electrical apparatus employing an inherent thermally responsive protective system including dynamoelectric machines, polyphase or single phase, A.C. or D.C. motors, generators, transformers and other electrical devices. This system provides both cable and contactor protection from overheating.

A preferred embodiment of the invention has been shown and described for the purpose of illustration, but various other embodiments and modifications are possible within the scope of the invention. For example, thermistor may be employed at each contact terminal, if desired. Therefore, it is to be understood that the invention is not limited to the specific details or construction shown, but in its broadest aspects, it includes all equivalent embodiments and modifications:

I claim as my invention:

1. An overtemperature protective system for electrical apparatus connected to external circuit conductors through a contactor, said protective system including a plurality of temperature sensitive resistance elements, said resistance elements being electrically connected together, and means responsive to change in resistance of one of the resistance elements for effecting deenergization of said apparatus, at least one of the resistance elements being disposed in heat transfer relation with said apparatus and at least one of the resistance elements being in heat transfer relation with both said contactor and one of said external circuit conductors.

2. An overtemperature protective system for electrical apparatus connected to external circuit conductors through a contactor, said contactor including terminal means for connecting said conductors thereto, said protective system including a plurality of temperature sensitive resistance elements, said resistance elements being electrically connected together, and means responsive to change in resistance of one of the resistance elements for effecting deenergization of said apparatus, at least one of the resistance elements being disposed in heat transfer relation with said apparatus and at least one of the resistance elements being associated with said terminal means to be in heat transfer relation with both the contactor and one of the external circuit conductors.

3. An overtemperature protective system for electrical apparatus connected to external circuit conductors through a contactor, said contactor including terminal means for connecting said conductors thereto, said protective system including a plurality of temperature sensitive resistance elements, said resistance elements being electrically connected together, and means responsive to change in resistance of one of the resistance elements for effecting deenergization of said apparatus, at least one of the resistance elements being disposed in heat transfer relation with said apparatus, and a screw member of good thermal conductivity cooperating with said terminal means to secure a conductor thereto, another of the resistance elements being disposed in said screw member in heat transfer relation therewith.

References Cited by the Examiner

UNITED STATES PATENTS

| | | | |
|---|---|---|---|
| 2,463,935 | 3/49 | Fish et al. | 317—13 |
| 2,626,331 | 1/53 | Basnett | 200—144 |
| 2,896,127 | 7/59 | Seeley | 317—41 X |
| 3,036,242 | 5/62 | MacGregor | 317—13 |

SAMUEL BERNSTEIN, *Primary Examiner.*